(12) United States Patent  (10) Patent No.: US 7,515,731 B2
Koto et al.  (45) Date of Patent: Apr. 7, 2009

(54) DIGITAL WATERMARK EMBEDDING APPARATUS AND DIGITAL WATERMARK DETECTING APPARATUS

(75) Inventors: Shinichiro Koto, Machida (JP); Wataru Asano, Yokohama (JP); Tomoo Yamakage, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1237 days.

(21) Appl. No.: 10/649,830

(22) Filed: Aug. 28, 2003

(65) Prior Publication Data

US 2004/0117629 A1 Jun. 17, 2004

(30) Foreign Application Priority Data

Aug. 30, 2002 (JP) .............................. 2002-255719

(51) Int. Cl.
G06K 9/00 (2006.01)
(52) U.S. Cl. ..................................................... 382/100
(58) Field of Classification Search .................. 382/100
See application file for complete search history.

(56) References Cited

U.S. PATENT DOCUMENTS

| | | | |
|---|---|---|---|
| 5,940,135 A | 8/1999 | Petrovic et al. | |
| 6,145,081 A | 11/2000 | Winograd et al. | |
| 6,175,627 B1 | 1/2001 | Petrovic et al. | |
| 6,415,041 B1 * | 7/2002 | Oami et al. | 382/100 |

| | | |
|---|---|---|
| 2004/0117629 A1 | 6/2004 | Koto et al. |

FOREIGN PATENT DOCUMENTS

| | | |
|---|---|---|
| EP | 1 001 368 A2 | 5/2000 |
| EP | 1 220 152 A2 | 7/2002 |
| JP | 11-346302 | 12/1999 |
| JP | 2000-165654 | 6/2000 |
| JP | 2001-16438 | 1/2001 |
| JP | 2001-224029 | 8/2001 |
| JP | 2002-77589 | 3/2002 |
| JP | 2002-191033 | 7/2002 |
| WO | WO 99/18723 | 4/1999 |

OTHER PUBLICATIONS

Saraju P. Mohanty, "Digital Watermarking: A Tutorial Review", (Online) Retrieved from the Internet, XP-002386431, 1999, pp. 1-24.
Mitchell D. Swanson, et al., "Transparent Robust Image Watermarking", Proceedings of the International Conference on Image Processing (ICIP) Lausanne, vol. 1, XP-010202368, Sep. 16, 1996, pp. 211-214.
Alejandro Loboguerrero, et al., "Implémentation d'un système de Tatouage Pour la Transmission de Données", XXIVémes Journées d' Étude sur la Parole, Nancy, XP-002386432, Jun. 24, 2002, 4 pages.

(Continued)

*Primary Examiner*—Tom Y Lu
(74) *Attorney, Agent, or Firm*—Oblon, Spivak, McClelland, Maier & Neustadt, P.C.

(57) ABSTRACT

A digital watermark embedding apparatus includes a detector detecting a signal characteristic of at least one of an input image signal and the output image signal, and a controller controlling an embedding intensity of a digital watermark signal with respect to the input image signal in accordance with the signal characteristic.

4 Claims, 9 Drawing Sheets

OTHER PUBLICATIONS

Raymond B. Wolfgang, et al., "Perceptual Watermarks for Digital Images and Video", Proceedings of the IEEE, vol. 87. No. 7, XP-011044240, Jul. 1999, pp. 1108-1126.

Damien Delannay, et al., "Compensation of Geometrical Deformations for Watermark Extraction in the Digital Cinema Application", Proceedings of the SPIE, vol. 4314, XP-002960804, Jan. 22, 2001, pp. 149-157.

Jeffrey A. Bloom, et al., "Copy Protection for DVD Video", Proceedings of the IEEE, vol. 87, No. 7, XP-011044224, Jul. 1999, pp. 1267-1276.

U.S. Appl. No. 11/467,804, filed Aug. 28, 2006, Kogure, et al.

Frank Hartung, et al., "Digital Watermarking of MPEG-2 Coded Video in the Bitstream Domain", 1997 IEEE, XP-010225693, vol. 4, Apr. 21, 1997, pp. 2621-2624.

R. Lancini, et al. "A Robust Video Watermarking Technique in the Spatial Domain", VIPromCom-2002, 4th EURASIP-IEEE Region 8 International Symposium on Video/Image Processing and Multimedia Communications, XP-010598723, Jun. 16-19, 2002, pp. 251-256.

U.S. Appl. No. 10/649,830, filed Aug. 28, 2003, Koto et al.
U.S. Appl. No. 10/808,279, filed Mar. 25, 2004, Asano et al.
U.S. Appl. No. 10/305,192, filed Nov. 27, 2002, Muratani et al.
U.S. Appl. No. 10/327,072, filed Dec. 24, 2002, Yamakage et al.
U.S. Appl. No. 10/626,610, filed Jul. 25, 2003, Asano et al.

* cited by examiner

DIGITAL WATERMARK EMBEDDING APPARATUS AND DIGITAL WATERMARK DETECTING APPARATUS

CROSS-REFERENCE TO RELATED APPLICATIONS

This application is based upon and claims the benefit of priority from the prior Japanese Patent Application No. 2002-255719, filed Aug. 30, 2002, the entire contents of which are incorporated herein by reference.

BACKGROUND OF THE INVENTION

1. Field of the Invention

The present invention relates to a digital watermark embedding apparatus which is effective to prevent an illegal copy of a digital moving image signal provided through, e.g., a recording medium.

2. Description of the Related Art

With spread of an apparatus which records and reproduces digital image data such as a digital VTR or a DVD (digital versatile disk), many digital moving images which can be reproduced by such an apparatus have been provided. Further, various kinds of digital moving images are distributed through the Internet or digital television broadcasting via a broadcasting satellite, a communication satellite and others, and users have begun to be able to utilize high-quality digital moving images.

A high-quality copy of a digital moving image can be readily created on a digital signal level, and it is in danger of being limitlessly copied if any copy inhibition or copy control is not applied. Therefore, in order to avoid an illegal duplication (copy) of digital moving images or control a generation number of duplications created by regular users, there has been considered a method for adding information for a copy control to a digital moving image and preventing an illegal copy by using this additional information, thereby limiting copies.

As a technique to superimpose another additional information on a digital moving image in this manner, there is known digital watermarking. The digital watermarking is a technique to embed identification information of a copyright holder or a user of a content, right information of a copyright holder, a utilization condition of a content, confidential information required when utilizing that content, or information such as the above-described copy control information (they are referred to as watermark information) in a content such as voices, music, moving pictures, still pictures converted into digital data so that such information cannot be easily perceived, and then perform a copyright protection including a utilization control a copy control protection by detecting the watermark information from the content according to needs, or facilitate a secondary use.

As one mode of digital watermarking, there is known a mode to which a spread spectrum technique is applied. In this mode, watermark information is embedded in a digital moving image by the following procedure.

[Step E1] An image signal is multiplied by a PN (Pseudo-random Noise) series in order to perform spectrum spreading.

[Step E2] The image signal after spectrum spreading is subjected to frequency conversion (e.g., DCT conversion).

[Step E3] Watermark information is embedded by changing a value of a specific frequency component.

[Step E4] Inverse frequency conversion (e.g., IDCT conversion) is applied.

[Step E5] Spectrum inverse spreading is applied (multiplying the same PN series as that at the step E1).

On the other hand, detection of the watermark information from the digital moving image in which the watermark information is embedded in this manner is carried out by the following procedure.

[Step D1] An image signal is multiplied by a PN (Pseudo-random Noise) series (the same PN series as that at the step E1) in order to perform spectral spreading.

[Step D2] The image signal after spectrum spreading is subjected to frequency conversion (e.g., DCT conversion).

[Step D3] Attention is paid to a value of a specific frequency component, and embedded watermark information is extracted.

In order to apply digital watermarking for the purpose of preventing an illegal use, the digital watermarking must have a property (robustness) that the watermark information cannot be lost or altered by various kinds of operations or intentional attacks which are assumed to be usually applied to digital productions.

One of most effective methods of increasing the robustness is increasing an embedding intensity of the digital watermark, thereby avoiding loss of information. However, when the embedding intensity of the digital watermark is increased, a digital watermark signal is perceived as a noise, which degrades an image quality. On the other hand, when the digital watermark signal itself is visually perceivable, the confidentiality of the digital watermarking mode is weakened, which further facilitates attacks.

That is, there is a trade-off relationship between the imperceptibility of the digital watermark signal (which will be referred to as transparency) and the robustness, and increasing the robustness without deteriorating the transparency is one of the most important objects in the digital watermark embedding.

BRIEF SUMMARY OF THE INVENTION

It is, therefore, an object of the present invention to provide a digital watermark embedding apparatus and a digital watermark detecting apparatus which can increase the robustness while maintaining the transparency.

According to an aspect of the present invention, there is provided a digital watermark embedding apparatus which generates an output image signal by embedding a digital watermark signal in an input image signal, comprising: a detector which detects a signal characteristic of at least one of the input image signal and the output image signal; and a control device which controls an embedding intensity of the digital watermark signal with respect to the input image signal in accordance with the signal characteristic.

According to another aspect of the present invention, there is provided a digital watermark detecting apparatus which detects a digital watermark signal included in a compressed first image signal, comprising: a decoder which decodes the first image signal into a non-compressed second image signal; and a detector which detects the digital watermark signal from the second image signal.

According to yet another aspect of the present invention, there is provided a digital watermark embedding apparatus comprising: an embedding device configured to embed a digital watermark signal in an input image signal having a first frame rate to generate a watermarked image signal; and a converter which converts the image signal into an output image signal having a second frame rate different from the first frame rate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments according to the present invention will now be described hereinafter with reference to the accompanying drawings.

First Embodiment

Figure 1:
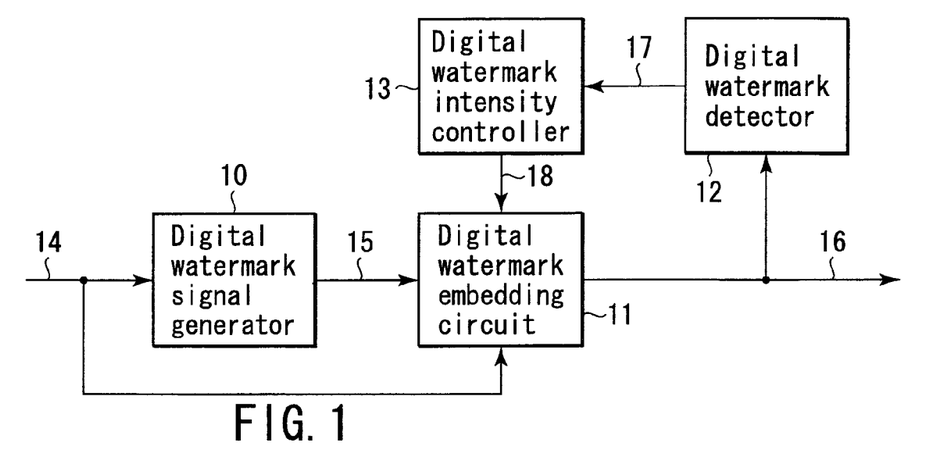
FIG. 1 is a block diagram showing a structure of a digital watermark embedding apparatus according to a first embodiment of the present invention.

FIG. 1 is a block diagram showing a structure of a digital watermark embedding apparatus according to a first embodiment of the present invention. The digital watermark embedding apparatus according to this embodiment has a digital watermark signal generator 10, a digital watermark embedding circuit 11, a digital watermark detector 12, and a digital watermark intensity controller 13.

An input image signal 14 is inputted to the digital watermark signal generator 10 and the digital watermark embedding circuit 11. A digital watermark signal 15 is generated by the digital watermark signal generator 10 using a known technique based on the input image signal 14, and this digital watermark signal 15 is embedded in the input image signal 14 by the digital watermark embedding circuit 11, thereby generating an output image signal 16.

The output image signal 16 is inputted to the digital watermark detector 12. The digital watermark detector 12 extracts the digital watermark signal from the output image signal 16, obtains a signal intensity of the extracted digital watermark signal, and supplies a signal intensity signal 17 to the digital watermark intensity controller 13. The digital watermark intensity controller 13 determines the embedding intensity of the digital watermark signal in accordance with the signal intensity information 17 in such a manner that, e.g., the signal intensity of the digital watermark signal extracted by the digital watermark detector 12 becomes constant, and supplies an embedding intensity control signal 18 to the digital watermark embedding circuit 11 based on this determination. In accordance with the embedding intensity control signal 18, the embedding intensity of the digital watermark signal 15 in the digital watermark embedding circuit 11 is controlled so as to be, e.g., a desired fixed intensity.

By feeding back the intensity of the digital watermark signal embedded in the output image signal 16 as the embedding intensity to the digital watermark embedding circuit 11 and controlling the embedding intensity of the digital watermark signal 15 in this manner, the digital watermark signal 15 can be stably embedded with a fixed intensity.

Second Embodiment

Figure 2:
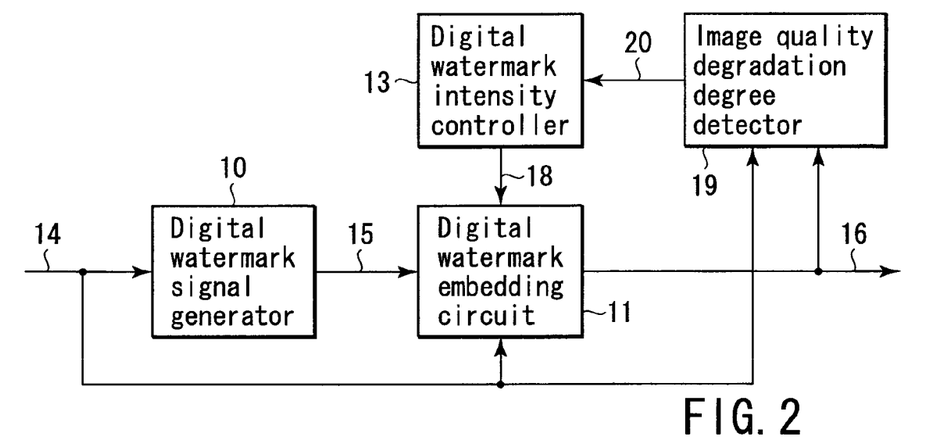
FIG. 2 is a block diagram showing a structure of a digital watermark embedding apparatus according to a second embodiment of the present invention.

FIG. 2 shows a structure of a digital watermark embedding apparatus according to a second embodiment of the present invention. This embodiment is different from the first embodiment in that the digital watermark detector 12 in FIG. 1 is substituted by an image quality degradation degree detector 19. The image quality degradation degree detector 19 receives image signals before and after embedding the digital watermark signal 15, i.e., the input image signal 14 and the output image signal 16, detects an image quality degradation degree of the output image signal 16 relative to the input image signal 14, and supplies image quality degradation information 20 to the digital watermark intensity controller 13. The image quality degradation degree is obtained as, e.g., a differential absolute value sum of pixel values (brightness values) of the input image signal 14 and the output image signal 16, or an average square error.

The digital watermark intensity controller 13 determines an embedding intensity of the digital watermark signal in accordance with the image quality degradation degree information 20 in such a manner that the image quality degradation degree becomes, e.g., not more than a predetermined threshold value, and supplies an embedding intensity control signal 18 to the digital watermark embedding circuit 11 based on this determination. When the embedding intensity of the digital watermark signal 15 in the digital watermark embedding circuit 11 is controlled in accordance with the embedding intensity control signal 18, a degradation in image quality due to embedding of the digital watermark signal 15 can be prevented from being perceived.

Third Embodiment

Figure 3:
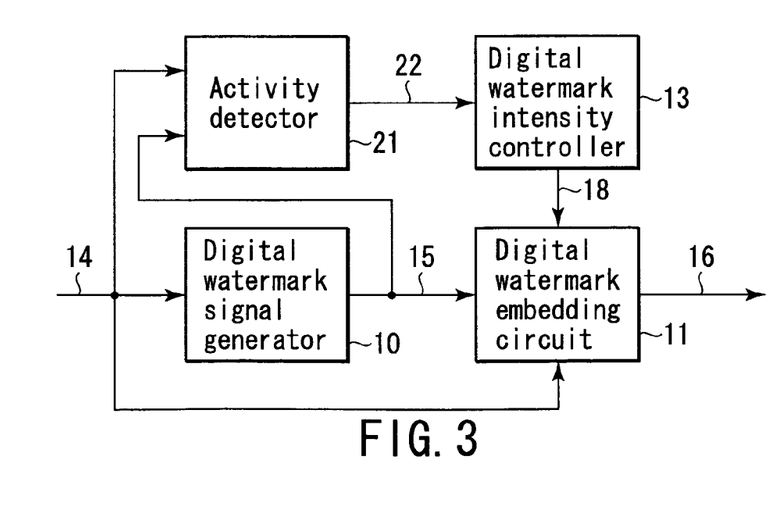
FIG. 3 is a block diagram showing a structure of a digital watermark embedding apparatus according to a third embodiment of the present invention.

FIG. 3 shows a structure of a digital watermark embedding apparatus according to a third embodiment of the present invention. The embedding intensity of the digital watermark signal is controlled by feedback in the first and second embodiments, whereas the embedding intensity of the digital watermark signal is controlled by a feed-forward control in this embodiment. Specifically, respective activities, i.e., complexities are detected from the input image signal 14 and the digital watermark signal 15 generated by the digital watermark signal generator 10 by an activity detector 21, and activity information 22 indicative of a ratio of the activities of the input image signal 14 and the digital watermark signal 15 is supplied to the digital watermark intensity controller 13, for example.

The digital watermark intensity controller 13 determines the embedding intensity of the digital watermark signal in accordance with the activity information 22 in such a manner that, e.g., the ratio of the activities of the input image signal 14 and the digital watermark signal 15 becomes a fixed value, and supplies an embedding intensity control signal. 18 to the digital watermark embedding circuit 11 based on this determination. When the embedding intensity of the digital embedding signal 15 in the digital watermark embedding circuit 11 is controlled in accordance with the embedding intensity control signal 18, the embedding intensity of the digital watermark signal can be increased to the maximum level while suppressing an image quality degradation due to embedding of the digital watermark signal 15.

Fourth Embodiment

Figure 4:
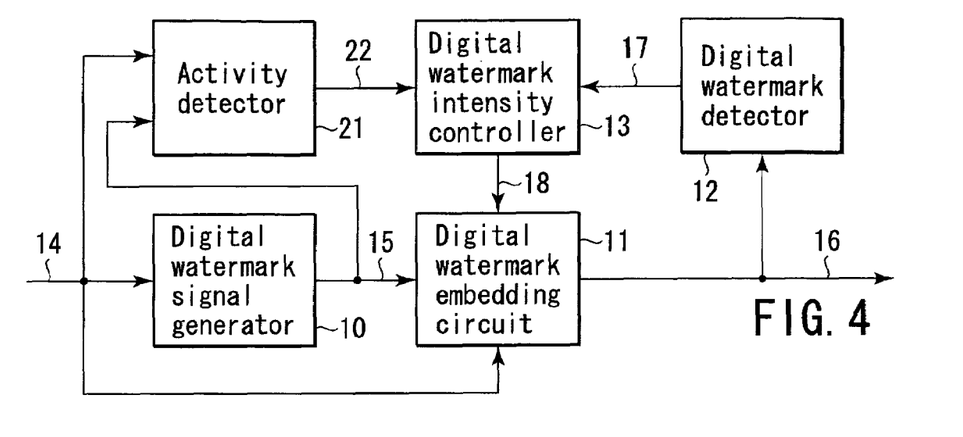
FIG. 4 is a block diagram showing a structure of a digital watermark embedding apparatus according to a fourth embodiment of the present invention.

FIG. 4 is a block diagram showing a structure of a digital watermark embedding apparatus according to a fourth embodiment of the present invention. In this embodiment, the feedback control based on the signal intensity of the digital watermark signal included in the output image signal 16 described in connection with the first embodiment is combined with the feed-forward control based on the activity information explained in conjunction with the third embodiment, thereby controlling the embedding intensity of the digital watermark signal.

That is, the digital watermark intensity controller 13 uses signal intensity information 17 outputted from the digital watermark detector 12 and activity information 22 outputted from an activity detector 21 to generate an embedding intensity control signal 18 as, e.g., a product of an embedding intensity adjustment quantity based on the signal intensity information 17 and an embedding intensity adjustment quantity based on the activity information 22 so as to be capable of maintaining a predetermined embedding intensity while suppressing an image quality degradation. When the embedding intensity of the digital watermark signal 15 in the digital watermark embedding circuit 11 is controlled in accordance with the embedding intensity control signal 18, the embedding intensity of the digital watermark signal 15 can be stably increased while suppressing the image quality degradation due to embedding of the digital watermark signal 15. Therefore, even if the output image signal 16 after embedding the digital watermark signal is degraded or distorted, the digital watermark can be detected in a further robust manner.

Fifth Embodiment

Figure 5:
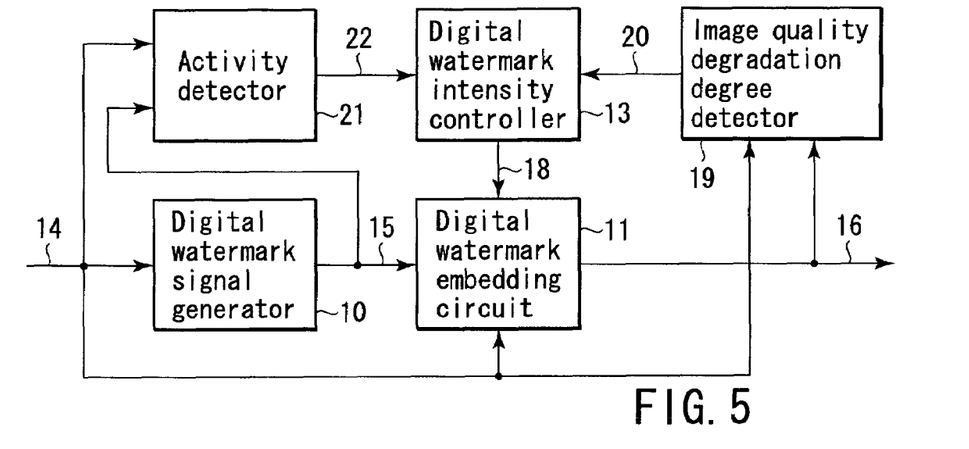
FIG. 5 is a block diagram showing a structure of a digital watermark embedding apparatus according to a fifth embodiment of the present invention.

FIG. 5 shows a structure of a digital watermark embedding apparatus according to a fifth embodiment of the present invention. In this embodiment, the feedback control based on an image quality degradation degree of the output image signal 16 relative to the input image signal 14 described in connection with the second embodiment is combined with the feed-forward control based on the activity information explained in the third embodiment, thereby controlling the embedding intensity of the digital watermark signal.

That is, the digital watermark intensity controller 13 uses image quality degradation degree information 20 outputted from the image quality degradation degree detector 19 and activity information 22 outputted from the activity detector 21 to generate an embedding intensity control signal 18 as, e.g., a product of an embedding intensity adjustment quantity based on the image quality degradation degree information 20 and an embedding intensity adjustment quantity based on the activity information 22 so as to be capable of maintaining a predetermined embedding intensity while suppressing an image quality degradation. When adopting such a structure controls the embedding intensity of the digital watermark signal 15 in the digital watermark embedding circuit 11 in accordance with the embedding intensity control signal 18, the embedding intensity of the digital watermark signal 15 can be stably increased while suppressing the image quality degradation due to embedding of the digital watermark signal 15.

Sixth Embodiment

Figure 6:
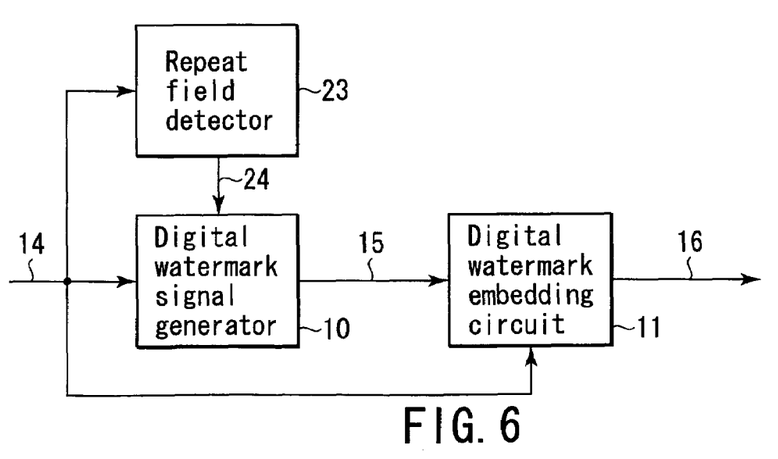
FIG. 6 is a block diagram showing a structure of a digital watermark embedding apparatus according to a sixth embodiment of the present invention.

FIG. 6 is a block diagram showing a structure of a digital watermark embedding apparatus according to a sixth embodiment of the present invention. In this embodiment, when the input image signal 14 is an image signal generated by telecine conversion, the digital embedding signal is embedded taking telecine conversion into consideration.

Figure 7:
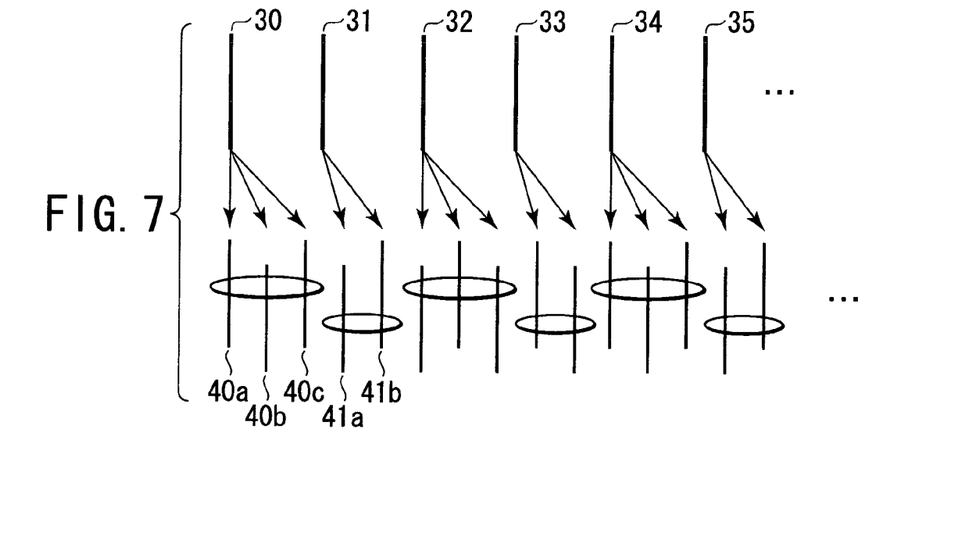
FIG. 7 is a view for illustrating telecine conversion and inverse telecine conversion.

To explain this embodiment, description will be first given as to telecine conversion and inverse telecine conversion with reference to FIG. 7. A frame rate (frame frequency) of a video recorded in a movie film is generally 24 Hz, and processing to convert this film video into a video signal (TV signal) whose frame rate is 30 Hz (field frequency: 60 Hz) is referred to as telecine conversion.

When performing telecine conversion, each of frames 30 to 35 of a film video is divided into two fields, i.e., a top field and a first field by interlace as shown in FIG. 7. Then, by inserting a field (repeat field) which redisplays the bottom field for each time into every two frames in the film video, a video image consisting of fields 40a to 40c, 41a to 41b, . . . is generated.

With this operation, for example, a frame 30 in the film video is converted into three fields 40a, 40b and 40c. In this fields, the fields 40a and 40b are fields based on the interlace, and the field 40c is the same repeat field as the field 40a. The next frame 31 in the field video is converted into two fields 41a and 41b based on the interlace. By alternately converting each one frame in the film video into three fields and two fields, frame rate conversion from 24 Hz to 30 Hz, i.e., telecine conversion is carried out.

On the contrary, an operation to return a video signal with a frame rate of 30 Hz obtained by telecine conversion into a signal of a film video with a frame rate of 24 Hz is referred to as inverse telecine conversion. The inverse telecine conversion is carried out by restoring one frame from two interlaced two fields.

In MPEG2 moving image compression used in, e.g., a DVD, when compressing a video signal obtained by telecine conversion, it is general to restore the frame rate to original 24 Hz by performing inverse telecine conversion and then executing compression encoding in order to increase the encoding efficiency. Usually, in inverse telecine conversion, the repeat field is automatically detected by calculating a correlation with or a difference from an inphase field in a precedent frame in accordance with each field of the video signal. For example, as indicated by Expression (1), $y_i(v, h)$ indicates a brightness signal of a pixel (v, h) in an ith field. When a sum $J_i$ of absolute value differences from the brightness signal of a second precedent field is calculated and $J_i$ is smaller than a predetermined threshold value, a field i is detected as the repeat field.

$$J_i = \sum_{v,h} |y_i(v, h) - y_{i-2}(v, h)| \quad (1)$$

In this embodiment, as shown in FIG. 6, a repeat field detector 23 is provided, the repeat field is detected like the above-described inverse telecine conversion from the input image signal 14 obtained by telecine conversion, and a detection signal 24 is supplied to the digital watermark signal generator 10. The digital watermark signal generator 10 recognizes whether the input image signal 10 corresponds to a regular field or the repeat field based on the detection signal 24, and generates the same signal as the digital watermark signal embedded in the second precedent field with respect to the repeat field. The thus generated digital watermark signal 15 is embedded in the input image signal 10 by the digital watermark embedding circuit 11.

When the digital watermark signal which differs in accordance with each field is embedded, detection of the repeat field becomes difficult in inverse telecine conversion at the time of compression encoding, thereby deteriorating the encoding efficiency. Alternatively, when the repeat field is detected and the repeat field is deleted in compression encoding, there is a problem that omission of the digital watermark signal occurs.

On the other hand, when the same digital watermark signal as that in the second precedent field is embedded in the repeat field like this embodiment, the signal in the repeat field matches with the signal in the second precedent field even after embedding the digital watermark signal 15. Therefore, detection of the repeat field is facilitated in inverse telecine conversion at the time of compression encoding, and the effect to inverse telecine conversion, e.g., a deterioration in the encoding efficiency can be eliminated. Moreover, even if the repeat field is deleted in inverse telecine conversion, since the digital watermark signal embedded in the repeat field is the same as that in the second precedent field, thereby avoiding omission of the digital watermark signal.

Seventh Embodiment

Figure 8:
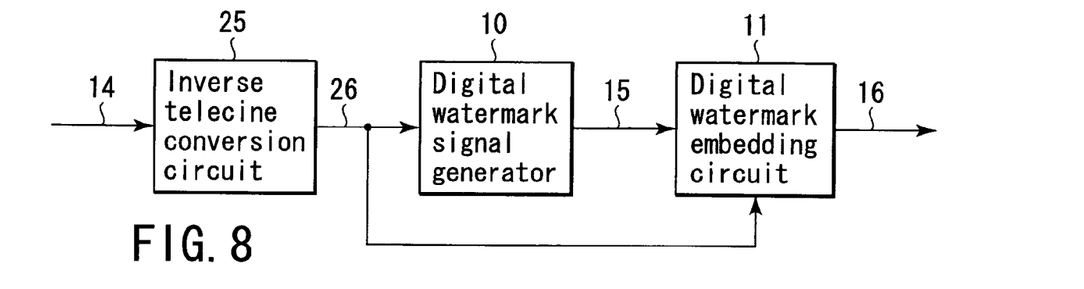
FIG. 8 is a block diagram showing a structure of a digital watermark embedding apparatus according to a seventh embodiment of the present invention.

FIG. 8 is a block diagram showing a structure of a digital watermark embedding apparatus according to a seventh embodiment of the present invention. This embodiment is another example of the technique of embedding the digital watermark signal taking telecine conversion into consideration when the input image signal 14 is an image signal generated by telecine conversion like the sixth embodiment.

In this embodiment, the input image signal 14 is subjected to inverse telecine conversion by an inverse telecine converter 25, and then inputted to the digital watermark signal generator 10 and the digital watermark embedding circuit 11. After inverse telecine conversion, the digital watermark signal 15 is embedded in the input image signal 14 generated by telecine conversion in this manner. As a result, the automatic effect to inverse telecine conversion involved by embedding of the digital watermark signal can be eliminated, and omission of the digital watermark signal involved by inverse telecine conversion can be avoided.

Eight Embodiment

Figure 9:
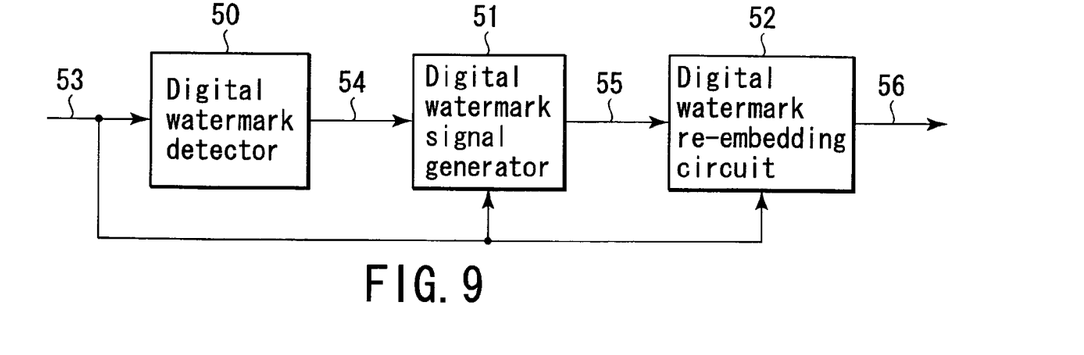
FIG. 9 is a block diagram showing a structure of a digital watermark embedding apparatus which re-embeds a digital watermark signal taking a geometric deformation into consideration according to an eighth embodiment of the present invention.

An eighth embodiment according to the present invention will now be described with reference to FIGS. 9 to 13. FIG. 9 is a view showing a structure of a digital watermark embedding apparatus according to this embodiment, and this is an apparatus which re-embeds the digital watermark signal to the image signal in which the digital watermark signal is embedded.

Such re-embedding of the digital watermark signal is used when again overwriting the already embedded digital watermark signal in order to reinforce the digital watermark signal weakened by compression encoding or repetition of recording and reproduction, or when rewriting the digital watermark signal in accordance with the number of times of copying in order to manage a generation of copies.

In this embodiment, a digital watermark detector 50 performs detection of the digital watermark and detection of a geometric deformation from an input image signal 53, and supplies digital watermark/geometric deformation information 54 to a digital watermark signal generator 51 based on results of these detections. The digital watermark signal generator 51 generates a digital watermark signal 55 based on the input image signal 53 and the digital watermark/geometric deformation information 54 detected by the digital watermark detector 50. By superimposing the thus generated digital watermark signal 55 on the input image signal 53 in a digital watermark re-embedding circuit 52, the digital watermark signal is re-embedded, and an output image signal 56 in which the digital watermark is re-embedded is generated.

In general, the image signal having the digital watermark signal embedded therein may be subjected to any geometric deformation in some cases. Specifically, there are a spatial geometric deformation such as scale-up/scale-down of a screen or parallel movement and a temporal geometric deformation such as fast-forward, slow playback or frame rate conversion.

Figure 10:
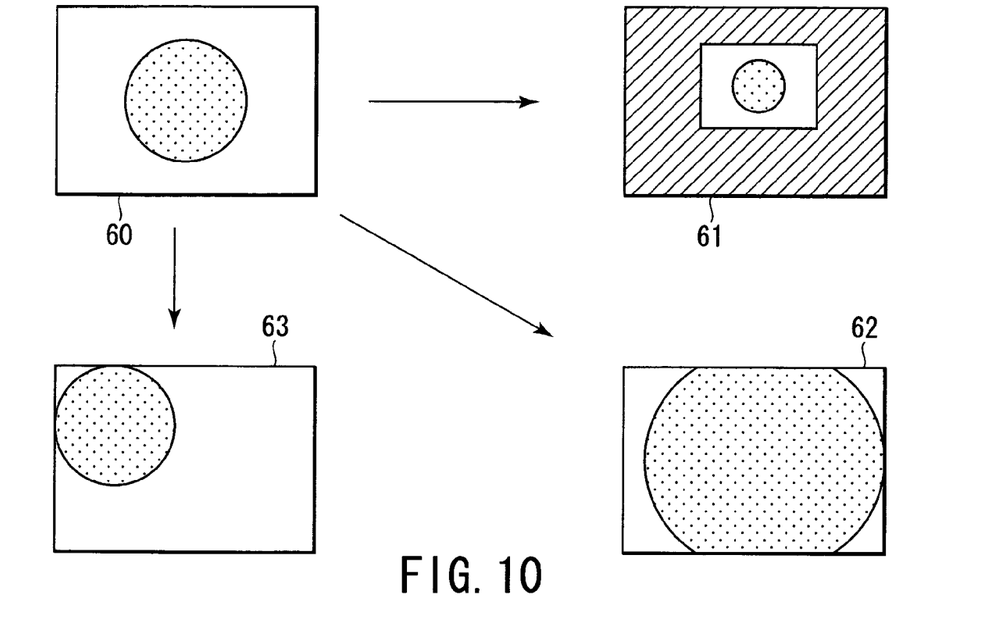
FIG. 10 is a view showing an example of a geometric deformation in a spatial direction of an image signal.

FIG. 10 shows an example of a spatial geometric deformation. A frame 60 is an image having a digital watermark signal embedded therein, and the digital watermark signal is embedded in a central part with undulating lines. With respect to the frame 60, a frame 61 shows a reduced image, a frame 62 shows an enlarged image, and a frame 63 shows an image moved to an upper left part in parallel.

Figure 11:
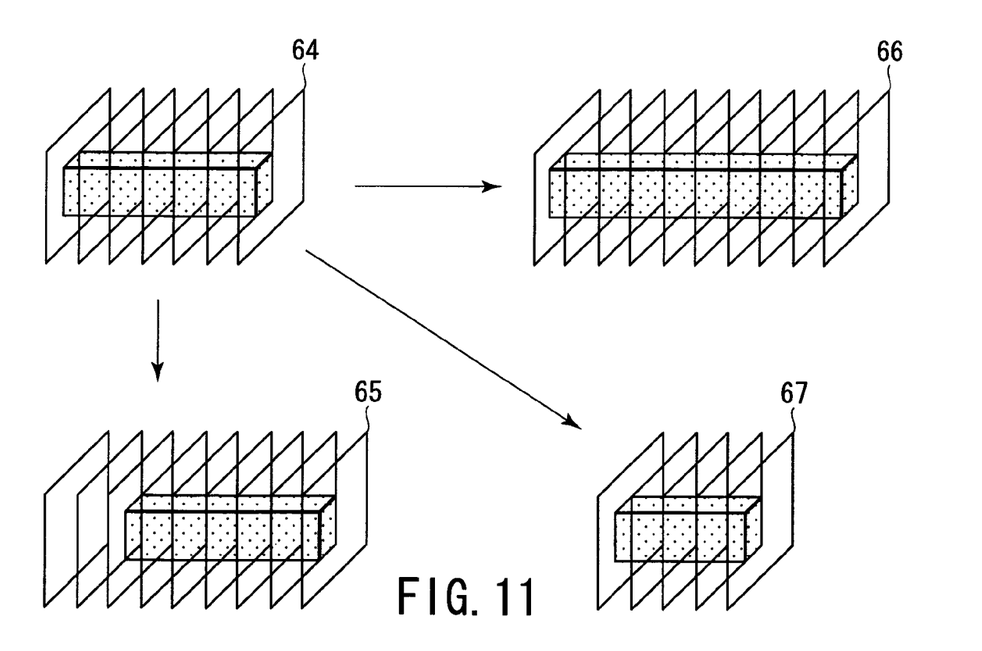
FIG. 11 is a view showing an example of a geometric deformation in a time direction of an image signal.

FIG. 11 shows an example that a digital watermark signal three-dimensionally embedded in a space-time of an image signal is subjected to a deformation in a temporal direction. A plurality of frames 64 show an image having a digital watermark signal three-dimensionally embedded in respective hatching parts. Frames 65 are an example of an image that a phase of the digital watermark signal is shifted in a temporal direction, frames 66 are an example of an image that the digital watermark signal is expanded in the temporal direction, and frames 67 are an example of an image that the digital watermark signal is subjected to compression of a time axis on the contrary to the frames 66.

When an image is subjected to a spatial or a temporal geometric deformation such as shown in FIG. 10 or FIG. 11, detection of the embedded digital watermark signal or re-embedding of the digital watermark signal generally becomes difficult. However, when performing detection or re-embedding of the digital watermark signal with respect to the image signal subjected to these geometric deformations, estimating parameters of the geometric deformations can increase a detection performance of the digital watermark signal, and re-embedding of the digital watermark can be accurately performed. In this embodiment, the digital watermark detector 50 shown in FIG. 9 can detect such parameters of the geometric deformations.

Figure 12:
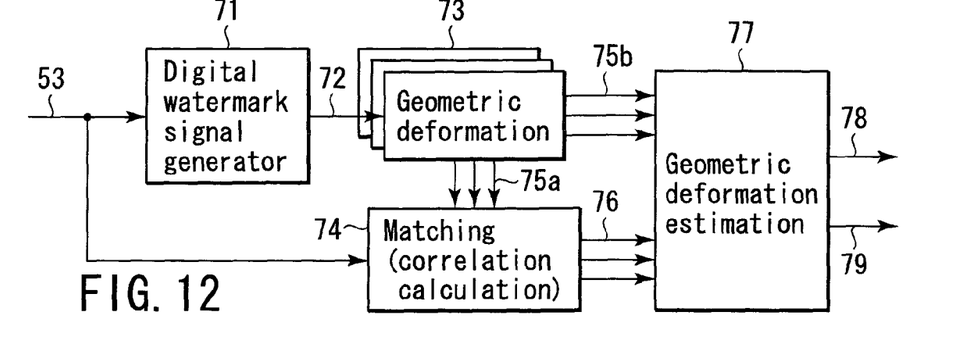
FIG. 12 is a block diagram showing a structural example of a digital watermark detector in the eighth embodiment according to the present invention.

FIG. 12 shows an example of an internal structure of the digital watermark detector 50 in FIG. 9. According to the structure of FIG. 12, detection of the digital watermark and estimation of the geometric deformation can be simultaneously performed. First, a digital watermark signal 72 is generated by a digital watermark signal generator 71 based on an image signal 53 having a digital watermark signal embedded therein by the same method as that used when embedding the digital watermark signal.

Then, a plurality of geometric deformation portions 73 apply geometric deformation processing with a plurality of different parameters such as scale-up/scale-down or parallel movement to the digital watermark signal 72, generate a plurality of digital watermark signals 75a subjected to the geometric deformation processing, and output respective geometric deformation parameters 75b.

A plurality of the digital watermark signals 75a after the geometric deformation processing and the input image signal 53 are inputted to a matching portion 74, a correlation calculation of the respective digital watermark signals 75a and the input image signal 53 is carried out, and a plurality of correlation coefficients 76 corresponding to the respective digital watermark signals 75a are generated.

The respective correlation coefficients 76 and the geometric deformation parameters 75b are inputted to a geometric deformation estimation portion 77. The geometric deformation estimation portion 77 compares greatnesses of the respective correlation coefficients 76, selects a geometric deformation parameter which gives he maximum correlation coefficient in a plurality of the digital watermark signals after the geometric deformation processing from the parameters 75b, and detects digital watermark information. The geometric deformation estimation portion 77 outputs information 78 of the selected geometric deformation parameter and the detected digital watermark information 79 as the digital watermarking/geometric deformation information 54 described in connection with FIG. 9.

Figure 13:
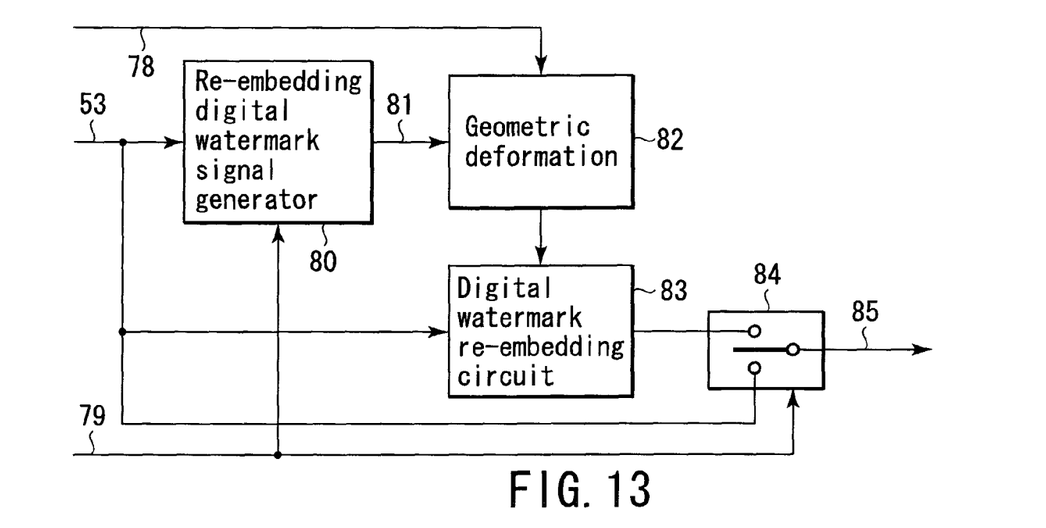
FIG. 13 is a block diagram showing a structural example of a digital watermark signal generator and a digital watermark re-embedding circuit in the eighth embodiment according to the present invention.

FIG. 13 shows an example of internal structures of the digital watermark signal generator 51 and the digital watermark re-embedding circuit 52 depicted in FIG. 9. The digital watermark signal generator 51 and the digital watermark re-embedding circuit 52 are arranged on rear stages of the digital watermark detector 50 depicted in FIG. 12.

A re-embedding digital water signal generator 80 generates a re-embedding digital watermark signal 81 based on the input image signal 53 and the digital watermark information 79 detected by the digital watermark detector 50 shown in FIG. 12. When re-embedding of the digital watermark signal aims at reinforcement of the digital watermark signal which has been already embedded in the input image signal 53, the re-embedding digital watermark signal generator 80 generates the same digital watermark signal as the detected digital watermark information 79. When re-embedding of the digital watermark signal aims at management of copy generations and the like, the re-embedding digital watermark signal generator 80 generates the digital watermark signal indicating that a copy generation has advanced.

The re-embedding digital watermark signal 81 is inputted into a geometric deformation portion 82 where a geometric deformation is applied based on the geometric deformation parameter 78 detected by the digital watermark detector 50 shown in FIG. 12. The re-embedding digital watermark signal after the geometric deformation is re-embedded in the input image signal 53 by a digital watermark re-embedding circuit 83.

At last, a selector 84 switches and outputs either the image signal having the digital watermark signal embedded therein or the image signal having no digital watermark signal embedded therein in accordance with the digital watermark information 79 detected by the digital watermark detector 50. For example, the selector 84 outputs the image signal in which the digital watermark signal used to update generation information is re-embedded when the digital watermark signal for copy generation management is embedded, and outputs the input image signal 53 in which the digital watermark signal is not re-embedded as it is when the digital watermark signal which does not require copy generation management is embedded.

Ninth Embodiment

Figure 14:
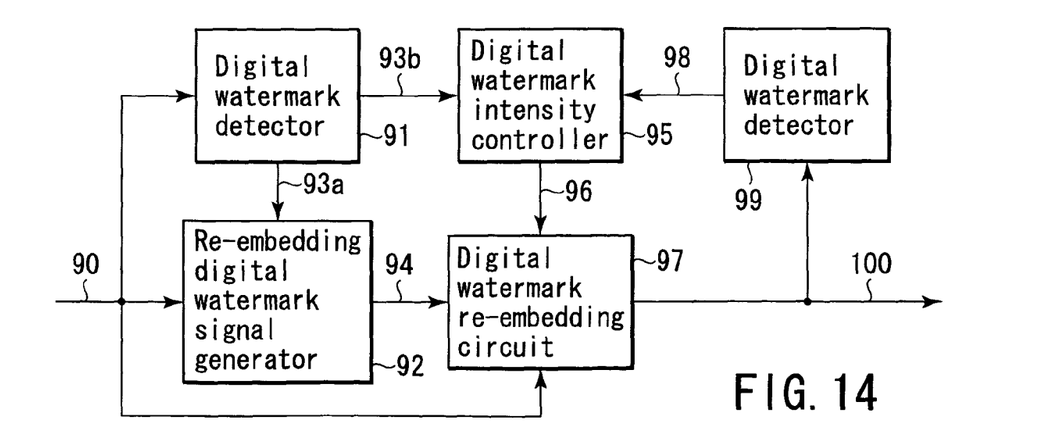
FIG. 14 is a block diagram showing a structure of a digital watermark embedding apparatus which has a feedback intensity controller and re-embeds a digital watermark signal according to a ninth embodiment of the present invention.

FIG. 14 is a block diagram showing a structure of a digital watermark re-embedding apparatus according to a ninth embodiment of the present invention, and the digital watermark re-embedding apparatus which re-embeds the digital watermark signal in the input image signal in which the digital watermark signal has been already embedded described in connection with the eighth embodiment has a function to control a re-embedding intensity.

A digital watermark detector 91 performs detection of the digital watermark information and estimation of the geometric parameter with respect to an input image signal 90 in which a digital watermark signal has been already embedded, and outputs digital watermark/geometric deformation information 93a like the digital watermark detector 50 described in connection with the eighth embodiment. The digital watermark detector 91 further outputs signal intensity information 93b indicative of an intensity of the detected digital watermark signal, and supplies it to a digital watermark intensity controller 95.

A re-embedding digital watermark signal generator 92 generates a re-embedding digital watermark signal 94 based on the digital watermark/geometric deformation information 93a from the digital watermark detector 91 and the input image signal 90 like the eighth embodiment. A digital watermark re-embedding circuit 97 generates an output image signal 100 by superimposing the re-embedding digital watermark signal 94 on the input image signal 90.

The output image signal 100 in which the digital watermark signal is re-embedded is inputted to the digital watermark detector 99. The digital watermark detector 99 extracts the digital watermark signal from the output image signal 100 like the first embodiment, and further detects a signal intensity, thereby supplying signal intensity information 98 to a digital watermark intensity controller 95.

The digital watermark intensity controller 95 determines an embedding intensity when re-embedding the digital watermark signal from the signal intensity of the digital watermark signal in the input image signal 90 and the signal intensity of the digital watermark signal in the output image signal 100 after re-embedding the digital watermark signal based on the signal intensity information 93a and 98, and supplies a re-embedding intensity control signal 96 to a digital watermark re-embedding circuit 97 based on this determination. As a result, a dynamic control over the re-embedding intensity of the digital watermark signal in the digital watermark re-embedding circuit 97 is carried out.

For example, when re-embedding of the digital watermark signal aims at intensity reinforcement by overwriting, the re-embedding intensity is controlled in such a manner that the detected intensity of the digital watermark detector 99 becomes higher than the detected intensity of the digital watermark detector 91. When digital watermark re-embedding aims at management of copy generations, the re-embedding intensity is controlled in such a manner that the detected intensity of the digital watermark detector 99 becomes substantially equal to the detected intensity of the digital watermark detector 91.

Therefore, according to this embodiment, the digital watermark re-embedding intensity can be stably controlled, a detection performance of the digital watermark signal after re-embedding can be guaranteed.

10th Embodiment

Figure 15:
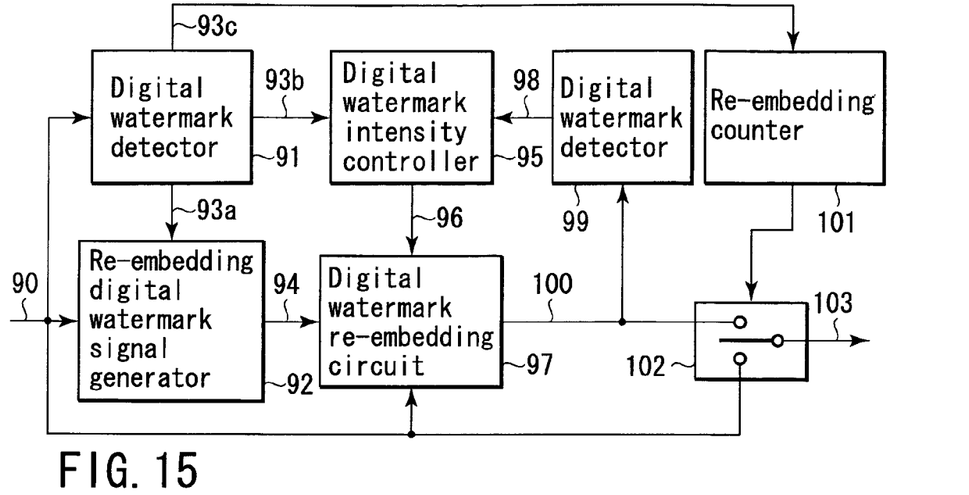
FIG. 15 is a block diagram showing a structure of a digital watermark embedding apparatus which re-embeds a digital watermark signal according to a 10th embodiment of the present invention.

FIG. 15 is a block diagram showing a structure of a digital watermark embedding apparatus having a function to control a re-embedding intensity of a digital watermark signal according to a 10th embodiment of the present invention. This embodiment has a structure that a re-embedding counter 101 and a selector 102 are added to the structure of the ninth embodiment shown in FIG. 14, and any other constituent element is the same as that in FIG. 14.

In this embodiment, a digital watermark detector 91 has a function to judge whether digital watermark re-embedding is required by detecting presence/absence of a digital watermark signal. When the digital watermark signal is detected and it is judged that re-embedding is required, it resets a re-embedding counter 101 by using a signal 93c, i.e., sets a predetermined initial value to the counter 101. The re-embedding counter 101 is a subtraction counter, and it continues countdown until a value becomes zero. A selector 102 selects an image signal 100 after digital watermark signal re-embedding from the digital watermark re-embedding circuit 97 in a period that a value of the re-embedding counter 101 is a value which is not zero, and selects the input image signal 90 when a value of the re-embedding counter 101 becomes zero, and outputs each result as an output image signal 103.

Description will now be given as to a procedure of digital watermark re-embedding processing in this embodiment by using a flowchart shown FIG. 16.

The digital watermark detector 91 generates of a detection event with a fixed cycle (step S1), decodes information of a digital watermark signal when a detection event is generated, judges whether re-embedding (remark) should be carried out (step S2), and sets an initial value by resetting the re-embedding counter 101 when it is judged that remark should be carried out (step S3).

Subsequently, whether a value of the re-embedding counter 101 is positive is checked (step S4), re-embedding of the digital watermark signal is carried out if the value is positive (step S5), and countdown if the re-embedding counter 101 is carried out (step S6). When the detection even is not generated (No at the step S1), and when the digital watermark signal which should be remarked is not detected (No at the step S2), digital watermark re-embedding (step S5) continues as long as a value of the re-embedding counter is positive at the step S4.

Figure 16:
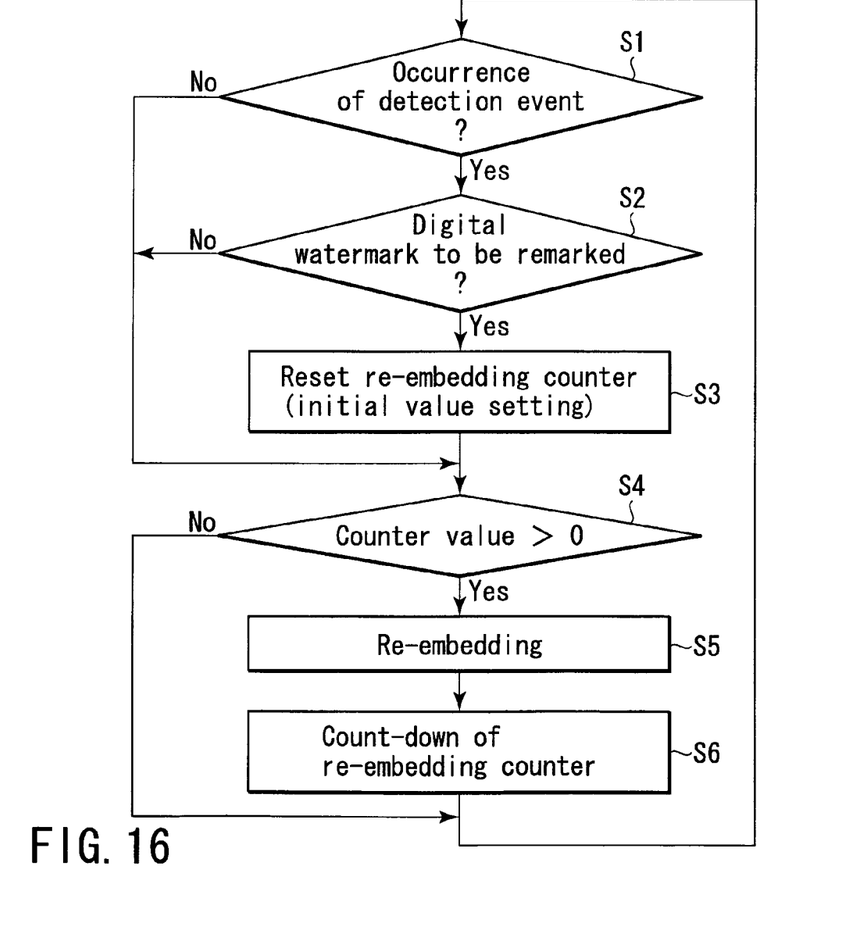
FIG. 16 is a flowchart showing a procedure of a digital watermark re-embedding control in the 10th embodiment according to the present invention.
Figure 17:
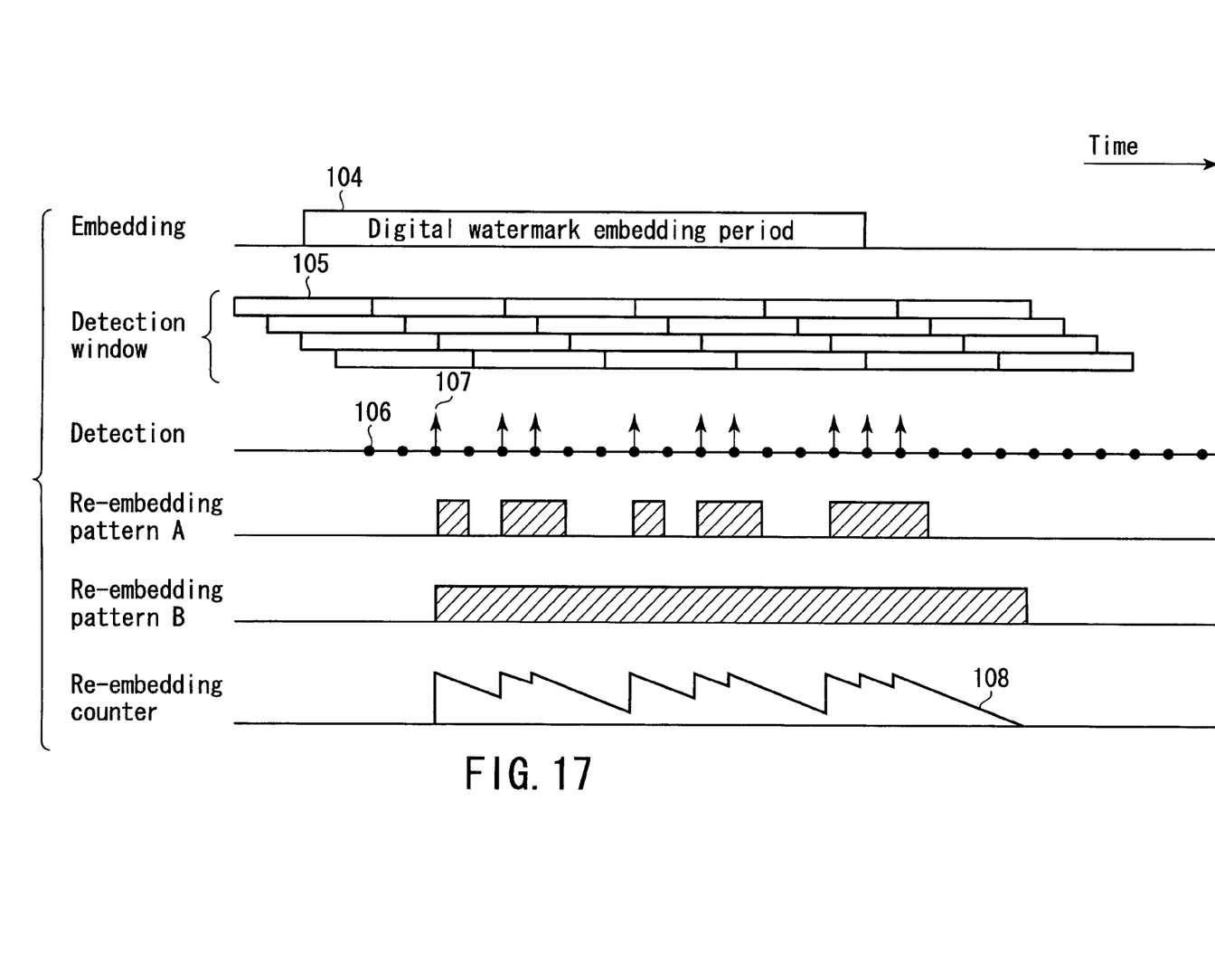
FIG. 17 is a timing chart showing the procedure of the digital watermark re-embedding control in the 10th embodiment according to the present invention.

FIG. 17 shows processing depicted in FIG. 16 in this embodiment in the form of a timing chart. A digital watermark signal is embedded in the input image signal 90 in cycle 104 of FIG. 17. A digital watermark detector 91 generates a detection event in a predetermined cycle while sliding a detection window 105 with a fixed time width. An end point of each detection window (106 in the drawing in case of a detection window 105) is a time that a detection even occurs, and an event indicated by an arrow in the drawing (e.g., 107) among these detection events indicates that the digital watermark which should be remarked is detected. Diagonal portions in a re-embedding pattern A and a re-embedding pattern B indicate a period that re-embedding processing is executed.

In the re-embedding pattern A, when the digital watermark which should be remarked is detected in accordance with each detection event, digital watermark re-embedding is carried out only in a period of one detection event cycle. When a digital watermark signal detection ratio in the digital watermark detector 91 is not 100%, using the re-embedding pattern A intermittently generates on/off of re-embedding processing of the digital watermark signal. Therefore, in case of detecting the digital watermark signal after receiving the image signal 103 outputted from the digital watermark re-embedding apparatus through a transmission path or a recording medium, it is difficult to stably perform detection.

On the other hand, in the re-embedding pattern B, an initial value is set in the re-embedding counter 101 every time the digital watermark signal which should be remarked is detected, and re-embedding is continued as long as a value of the re-embedding counter 101 is positive. Therefore, re-embedding of the digital watermark signal 94 can be stably carried out in the digital watermark re-embedding circuit 97 without depending on a digital watermark signal detection ratio in the digital watermark detector 91. Further, the image signal 103 outputted from the digital watermark re-embedding apparatus can be received, and the re-embedded digital watermark can be stably detected when detecting the digital watermark signal.

FIG. 17 also shows a time fluctuation pattern 108 of a value of the re-embedding counter 101. As apparent from this pattern 108, it is preferable for an initial value of the re-embedding counter 101 when resetting to be equal to or longer than a length of a detection window 105, and the re-embedded digital watermark signal can be thereby stably detected.

11th Embodiment

Figure 18:
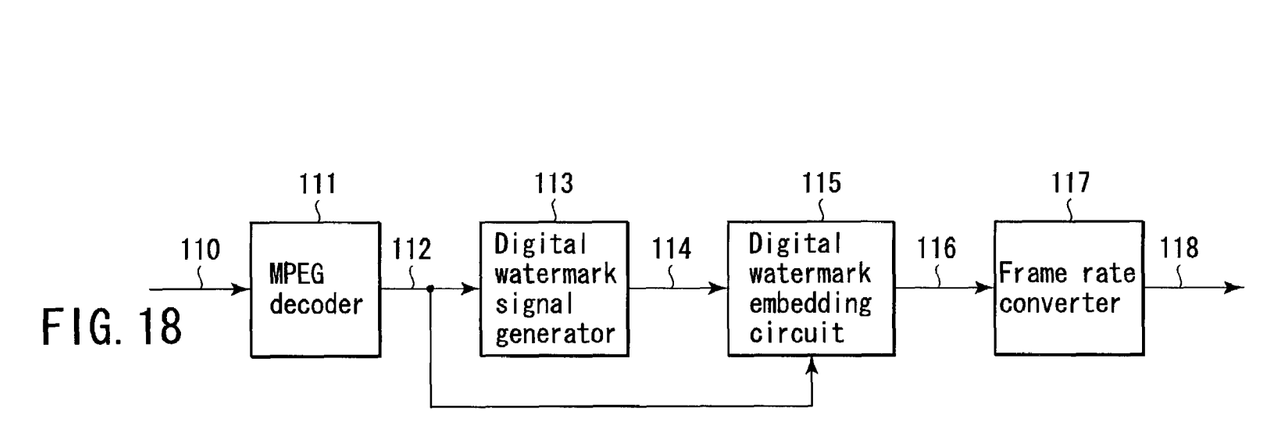
FIG. 18 is a block diagram showing a structure of a digital watermark embedding apparatus according to an 11th embodiment of the present invention.

FIG. 18 is a view showing a structure of a digital watermark embedding apparatus according to an 11th embodiment of the present invention. In this embodiment, a digital watermark signal generator 113 and a digital watermark embedding circuit 115 are sequentially arranged on rear stages of an MPEG decoder 111 which decodes image data 110 compressed by a moving image compression mode such as MPEG. A frame rate converter 117 is arranged on a rear stage of the digital watermark embedding circuit 115.

That is, a digital watermark signal 114 generated by the digital watermark signal generator 113 is embedded in an image signal 112 decoded by the MPEG decoder 111 by using the digital watermark embedding circuit 115. The frame rate converter 117 converts a frame rate of the image signal 116 having the digital watermark signal 114 embedded therein, thereby generating an output image signal 118. The frame rate converter 117 performs telecine conversion or frame rate conversion according to a characteristic or the like of a display device.

According to this embodiment, by embedding the digital watermark signal in the image signal 112 immediately after decoding before frame rate conversion is performed, common digital watermark signal embedding can be readily performed irrespective of an output frame rate (frame rate of the output image signal 118). Therefore, digital watermark embedding which differs in accordance with each output frame rate does not have to be carried out, thereby realizing digital watermark signal embedding processing at a low cost.

12th Embodiment

Figure 19:
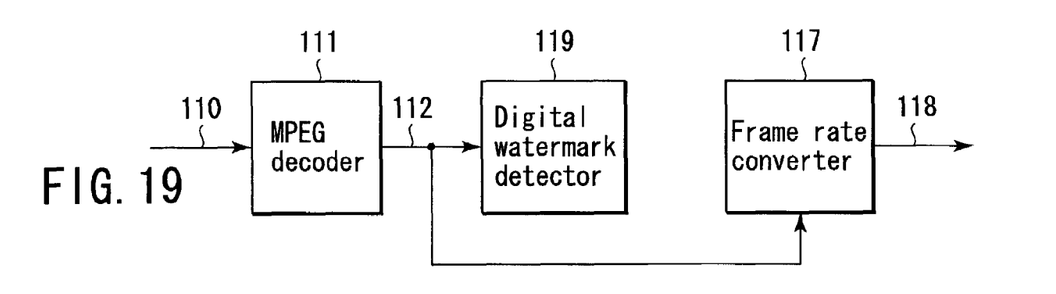
FIG. 19 is a block diagram showing a structure of a digital watermark detecting apparatus according to a 12th embodiment of the present invention.

FIG. 19 is a view showing a structure of a digital watermark detecting apparatus according to a 12th embodiment of the present invention. In this embodiment, a digital watermark detector 119 and a frame rate converter 117 are arranged in parallel at rear stages of an MPEG decoder 111 which decodes image data 110 compressed by a moving image compression mode such as MPEG. That is, detection of a digital watermark signal and frame rate conversion are simultaneously executed with respect to an image signal 112 decoded by the MPEG decoder 11, thus generating an output image signal 118.

According to this embodiment, by performing detection of a digital watermark signal with respect to the image signal 112 immediately after decoding before frame rate conversion is effected like the 11th embodiment, common digital watermark signal detection can be easily performed irrespective of an output frame rate (frame rate of the output image signal 118), and digital watermark detection which varies depending on each output frame rate does not have to be carried out, thereby executing stable digital watermark detection while suppressing a detection cost.

13th Embodiment

Figure 20:
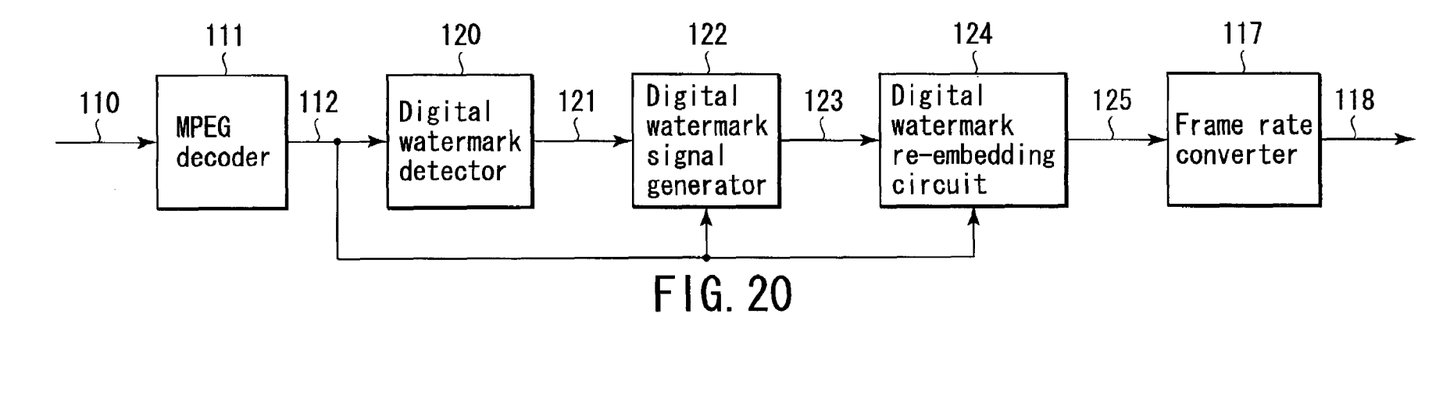
FIG. 20 is a block diagram showing a structure of a digital watermark re-embedding apparatus according to a 13th embodiment of the present invention.

FIG. 20 is a view showing a structure of a digital watermark re-embedding apparatus according to a 13th embodiment of the present invention. In this embodiment, a digital watermark detector 120, a digital watermark signal generator 122 and a digital watermark re-embedding circuit 124 are sequentially arranged on rear stages of an MPEG decoder 111 which decodes image data 110 compressed by a moving image compression mode such as MPEG. A frame rate converter 117 is arranged on a rear stage of the digital watermark re-embedding circuit 124.

That is, the digital watermark detector 120 is used to detect a digital watermark signal with respect to an image signal 112 decoded by the MPEG decoder 111, the re-embedding digital watermark signal generator 122 is used to generate a re-embedding digital watermark signal 123 in accordance with a digital watermark detection result 121 and the decoded image signal 112, and the frame rate converter 117 is used to perform frame rate conversion with respect to an image signal 125 in which the digital watermark signal is re-embedded by the digital watermark re-embedding circuit 124, thereby generating an output image signal 118.

According to this embodiment, the digital watermark detection and the re-embedding processing can be realized as common processing irrespective of an output frame rate (frame rate of the output image signal 118) by performing the digital watermark detection and the re-embedding with respect to the image signal 112 immediately after decoding before frame rate conversion is effected. Therefore, the digital watermark detection and the re-embedding which differ in accordance with each output frame rate do not have to be carried out, and the stable digital watermark detection and re-embedding can be executed while suppressing a processing cost.

14th Embodiment

Figure 21:
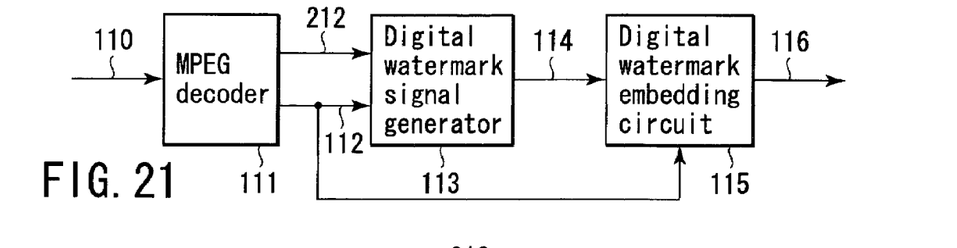
FIG. 21 is a block diagram showing a structure of a digital watermark embedding apparatus according to a 14th embodiment of the present invention.

FIG. 21 is a view showing a structure of a digital watermark embedding apparatus according to another embodiment of the present invention. In this embodiment, a digital watermark signal generator 113 and a digital watermark embedding circuit 115 are sequentially arranged on rear stages of an MPEG decoder 111 which decodes image data 110 compressed by a moving image compression mode such as MPEG.

The decoded image signal 112 and time stamp information 212 concerning a display time of each decoded frame or field are outputted from the MPEG decoder 111. Generation of a digital watermark signal by the digital watermark signal generator 113 and embedding of a digital watermark signal by the digital watermark embedding circuit 115 are carried out with respect to the decoded image signal 112 in accordance with the time stamp information 212 concerning the display time, thereby generating an output image signal 116 having the digital watermark embedded therein.

15th Embodiment

Figure 22:
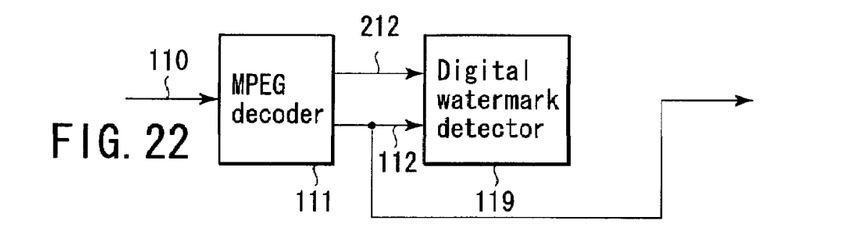
FIG. 22 is a block diagram showing a structure of a digital watermark detecting apparatus according to a 15th embodiment of the present invention.

FIG. 22 is a block diagram showing a structure of a digital watermark detecting apparatus according to another embodiment of the present invention. In this embodiment, a digital watermark detector 119 is arranged on a rear stage of an MPEG decoder 111 which decodes image data 110 compressed by a moving image compression mode such as MPEG.

Like the 14th embodiment, a decoded image signal 112 and time stamp information 212 concerning a display time of each decoded frame or field are outputted from the MPEG decoder 111. In this embodiment, detection of a digital watermark signal by the digital watermark detector 119 is performed with respect to the decoded image signal 112 in accordance with the time stamp information 212 concerning the display time and, at the same time, the decoded image signal 112 is outputted.

16th Embodiment

Figure 23:
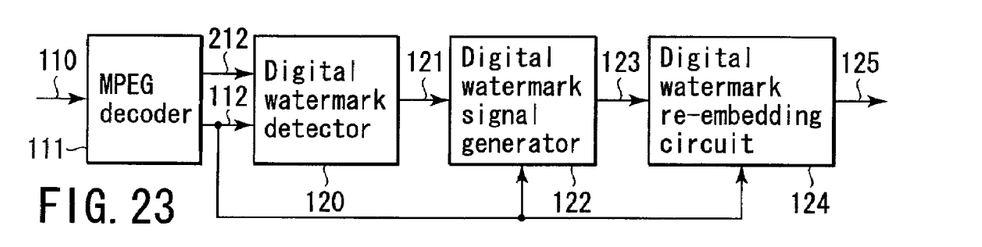
FIG. 23 is a block diagram showing a structure of a digital watermark re-embedding apparatus according to a 16th embodiment of the present invention.

FIG. 23 is a view showing a structure of a digital watermark embedding apparatus which re-embeds a digital watermark signal according to a 16th embodiment of the present invention. In this embodiment, a digital watermark detector 120, a digital watermark signal generator 122 and a digital watermark re-embedding circuit 124 are sequentially arranged on rear stages of an MPEG decoder 111 which decodes image data 110 compressed by a moving image compression mode such as MPEG. Like the 14th and 15th embodiments, from the MPEG decoder 111 are outputted a decoded image signal 112 and time stamp information 212 concerning a display time of each decoded frame or field.

In this embodiment, detection of a digital watermark signal by the digital watermark detector 120, generation of a re-embedding digital watermark signal by the digital watermark signal generator 122 and re-embedding of the digital watermark signal by the digital watermark re-embedding circuit 124 are performed with respect to the decoded image signal 112 in accordance with the time stamp information 212 concerning the display time, and an image signal 125 having the digital watermark signal re-embedded therein is outputted.

Figure 24:
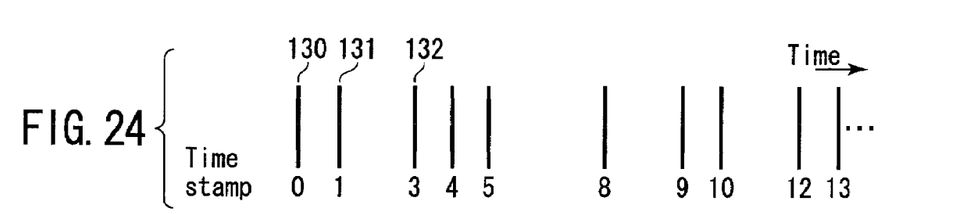
FIG. 24 is a view showing an example of a time stamp of a decoded image.
Figure 25:
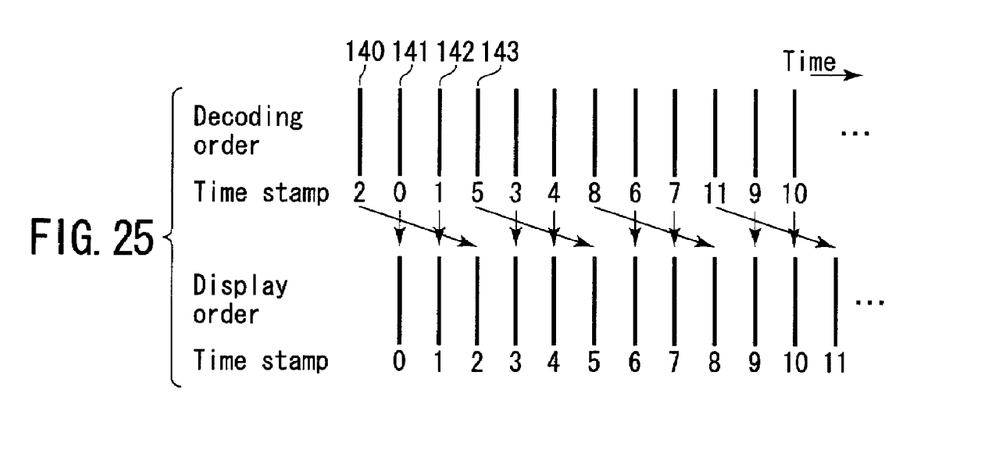
FIG. 25 is a view showing an example of a time stamp of a decoded image.

A moving image signal compressed by MPEG or the like may have an encoding frame rate which is not fixed due to frame thinning, inverse telecine conversion and the like, and encoding and decoding orders and a display order of frames or fields may different from each other by reordering. FIGS. 24 and 25 show this state.

FIG. 24 shows an example that a frame rate becomes variable due to frame thinning. In encoded frames 130, 131 and 132, time stamps concerning respective display times are uniquely determined at the time of decoding as information which determines display times of the respective frames.

FIG. 25 shows an example of reordering, where encoded frames 140, 141, 142 and 143 are aligned in the order of encoding or decoding, and respective time stamps are uniquely determined as information which determines display times.

In cases where embedding, detection or re-embedding of a digital watermark is processed as a spatiotemporal three-dimensional pattern with respect to a moving image signal, when frame thinning or reordering due to encoding has an effect, it is difficult to accurately perform embedding, detection or re-embedding. In the moving image encoding mode such as MPEG, however, a time stamp concerning a display time is uniquely determined at the time of decoding in accordance with each encoded frame or field. Therefore, like this embodiment, embedding, detection or re-embedding of a digital watermark can be accurately carried out by receiving the time stamp information 212 from the MPEG decoder and executing embedding, detection or re-embedding of the digital watermark even if spatiotemporal processing is included in each processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark embedding apparatus which generates an output image signal by embedding a digital watermark signal in an input image signal, comprising:
    a detector which detects a signal characteristic of at least one of the input image signal and the output image signal; and
    a control device configured to control an embedding intensity of the digital watermark signal with respect to the input image signal in accordance with the signal characteristic,
    wherein the detector includes
    a first detector which detects a signal intensity of the digital watermark signal which is extracted from the output image signal; and
    a second detector which detects an activity indicating complexity from at least one of the input image signal and the digital watermark signal, and
    the control device controls the embedding intensity of the digital watermark signal with respect to the input image signal based directly on the detected signal intensity and the detected activity.

2. The digital watermark embedding apparatus of claim 1, wherein the control device controls the embedding intensity of the digital watermark signal based only on the detected signal intensity and the detected activity.

3. A digital watermark embedding apparatus which generates an output image signal by embedding a digital watermark signal in an input image signal, comprising:
    a detector which detects a signal characteristic of at least one of the input image signal and the output image signal; and
    a control device configured to control an embedding intensity of the digital watermark signal with respect to the input image signal in accordance with the signal characteristic, wherein the detector includes
    a first detector which detects an image quality degradation degree of the output image signal with respect to the input image signal; and
    a second detector which detects an activity indicating complexity from at least one of the input image signal and the digital watermark signal, and
    wherein the control device controls the embedding intensity of the digital watermark signal with respect to the input image signal based directly on the detected image quality degradation degree and the detected activity.

4. The digital watermark embedding apparatus according to claim 3, wherein the control device generates an embedding intensity control signal as a product of a first embedding intensity adjustment quantity and a second embedding intensity adjustment quantity, and controls the embedding intensity by the embedding intensity control signal, the first embedding intensity adjustment quantity being for adjusting embedding intensity of the digital watermark signal by feedback control so that the image quality degradation degree detected by the first detector become not more than a predetermined threshold value, the second embedding intensity adjustment quantity being for adjusting the embedding intensity by feed-forward control so that a ratio of the activities of the input image signal and the digital watermark signal detected by the second detector become a fixed value.

* * * * *